United States Patent [19]

Dagna et al.

[11] Patent Number: 4,628,334

[45] Date of Patent: Dec. 9, 1986

[54] INK JET PRINT HEAD CARTRIDGE ASSEMBLY

[75] Inventors: Giandomenico Dagna, Ivrea; Franco Morin, Banchette, both of Italy

[73] Assignee: Ing. C. Olivetti & C., S.p.A., Ivrea, Italy

[21] Appl. No.: 702,061

[22] Filed: Feb. 15, 1985

[30] Foreign Application Priority Data

Feb. 15, 1984 [IT] Italy .............................. 67137 A/84

[51] Int. Cl.[4] .............................................. G01D 15/16

[52] U.S. Cl. .................................. 346/140 R; 400/126

[58] Field of Search .............. 346/75, 140 R; 400/126

[56] References Cited

U.S. PATENT DOCUMENTS

| | | | |
|---|---|---|---|
| 4,432,005 | 2/1984 | Duffield et al. | 346/140 R |
| 4,447,820 | 5/1984 | Terasawa | 346/140 R |
| 4,503,442 | 3/1985 | Barbero et al. | 346/140 R |
| 4,510,510 | 4/1985 | Terasawa | 346/140 R |

FOREIGN PATENT DOCUMENTS

| | | | |
|---|---|---|---|
| 8201671 | 11/1983 | Japan | 400/126 |

*Primary Examiner*—E. A. Goldberg
*Assistant Examiner*—Gerald E. Preston
*Attorney, Agent, or Firm*—Banner, Birch, McKie & Beckett

[57] ABSTRACT

The head comprises at least one nozzle (38) associated with two electrodes and carried by a holder (14) into which an ink cartridge (50) can be fitted. The cartridge is filled with ink and sealed after it has been filled. The cartridge terminates at one end with a cylindrical portion (60) which is closed by a diaphragm which can be ruptured upon insertion in the head. The diaphragm is ruptured by a tube (66) which projects within the holder and which communicates with the printing nozzles (38). The cylindrical portion (60) of the cartridge is offset with respect to the longitudinal axis of the cartridge to ensure correct insertion thereof. At the other end the cartridge is closed by a cover (87) having an aperture which is disposed above the free level (PL) of the ink and which is initially closed by a second diaphragm. The second diaphragm is ruptured by a movable suction conduit (102) which is manually fitted to the cartridge to lock the latter in position and to permit a pump to exhaust the gases which are formed during the printing operation. The printing head may comprise a holder having a plurality of housings in side-by-side relationship for the insertion of corresponding cartridges containing inks of different colors.

18 Claims, 10 Drawing Figures

INK JET PRINT HEAD CARTRIDGE ASSEMBLY

BACKGROUND OF THE INVENTION

The present invention relates to a selective ink jet printing head and an ink cartridge for such a head.

In particular, the printing head is of the type wherein the ink is projected on to a printing carrier, normally a strip of paper, by way of one or more nozzles, by means of an electrical discharge through the ink contained within each nozzle. Various heads of the above-indicated kind have been proposed. They normally comprise a reservoir for the ink, which is closed by a nozzle and a pair of electrodes, at least one of which is in contact with the ink. In a known printer, the head is mounted removably on a carriage and may be replaced when the ink is used up, together with the electrodes, so that the exchange operation is rather expensive.

SUMMARY OF THE INVENTION

The object of the present invention is to provide a head of the above-indicated kind, wherein replacement of each ink reservoir is simple and inexpensive.

Accordingly the invention provides a wherein a conductive ink is in contact with one of a pair of electrodes and is ejected through a nozzle by voltage pulses applied to said electrodes, comprising a holder for removably housing at least one ink cartridge filled with said ink and having an ink conduit normally closed by a diaphragm, said holder being closed at one end by a front wall portion and open at the opposite end to permit the cartridge to be inserted in or removed from the holder, said front wall portion carrying a nozzle plate carrying at least one nozzle passing therethrough, said pair of electrodes being disposed on opposite surfaces of said plate and said one electrode surrounding the inner edge of said nozzle, said front wall portion further carrying a hollow engaging member aligned and communicating with said nozzle and adapted to penetrate into said conduit by perforating said diaphragm when said cartridge is inserted in the holder, whereby the ink is brought in contact with said at least one electrode. The invention also provides a ink cartridge for use with a printing head, said cartridge being adapted to be removably fitted to said head and having an elongated shape, said cartridge comprising an engagement member carried on a first end of said cartridge to be engaged with a corresponding conduit of said head for supplying the ink to said head, a first diaphragm closing said engaging member, an opening provided on a closure wall disposed at another end of said cartridge opposite to said first end to be engaged by a locking member of said head, and a second diaphragm closing said opening, said diaphragms being rupturable by said conduit and said locking member respectively when said cartridge is fitted into said head.

The invention will be described in more detail, by way of example, with reference to the accompanying drawings.

DESCRIPTION OF THE PREFERRED EMBODIMENT

Figure 1:
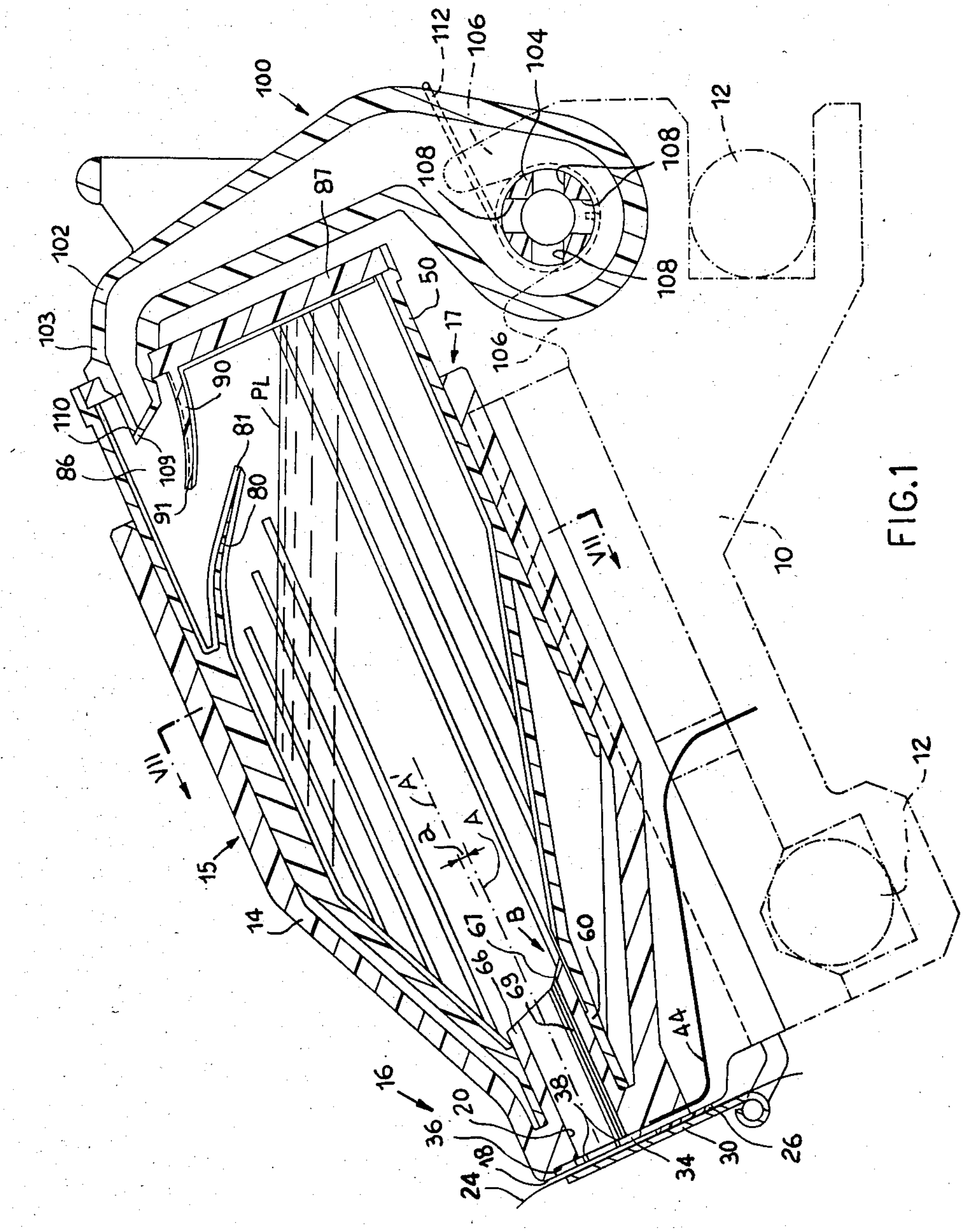
FIG. 1 is a view in longitudinal section of a selective ink jet printing head embodying the invention.

Referring to FIG. 1, the printing head comprises a carriage 10 which is movable along two parallel guides 12 and which carries a container or holder 14. The holder 14 terminates at its front end with an end portion 16 which is defined at its front by a flat surface 18 which is perpendicular to the longitudinal axis A' of the holder 14 and through which passes a hole 20 for the ink to pass therethrough. The surface 18 is arranged to face towards a vertically movable printing carrier 24, which is maintained at a small spacing from the surface 18 by means of a spacer member 26, and a paper-pressure plate 30 which is hinged on the carriage 10.

On the surface 18 of the holder 14, a plate member 34 of ceramic material is fitted into and bonded in a seat 36 which is set back with respect to the surface 18. The plate 34 may be for example of alumina but any other material with a high degree of hardness, which is electrically insulating and which has a high level of resistance to chemical agents may be used to provide the plate 34.

Through the plate 34 extends a plurality of nozzles 38, the number of which depends on the form of the printing matrix used. Associated with each nozzle 38 is a pair of electrodes 40 and 42 (see FIG. 6) which are disposed on the two faces of the plate 34. Therefore the electrode 42 which is disposed on the inside surface of the plate 34 and which may be common to all the nozzles is constantly in contact with the ink which is electrically conductive. A flat flexible conductor member 44 having a plurality of conductor tracks is bonded to the plate member 34 to connect the electrodes 40 and 42 to a control circuit (not shown in the drawings). Printing is effected by emitting droplets of ink through the nozzles 38. For that purpose, by selectively exciting an outside electrode 40 with a voltage pulse, a high density of electric current is generated in the corresponding nozzle 38. That therefore gives rise to a pressure wave which expels one or more droplets of ink, substantially as described in the present applicants' Italian patent application No 67783-A/83, the description of which is hereby deemed to be incorporated by reference. As described in that application, bubbles of gas are also produced in the nozzle 38, which have a tendency to accumulate within the ink duct.

The holder 14 is arranged to hold a single cartridge or reservoir 50 (see FIG. 2) for a single-colour printing head. The holder 14 is formed by a cylindrical body 15 which is complementary in shape to the cartridge 50 and which is open at a rearward end 17 of insertion of the cartridge 50. The internal dimensions of the holder 14 match the outside dimensions of the cartridge 50 to permit it to be manually inserted and removed with a minimum amount of force.

Figure 2:
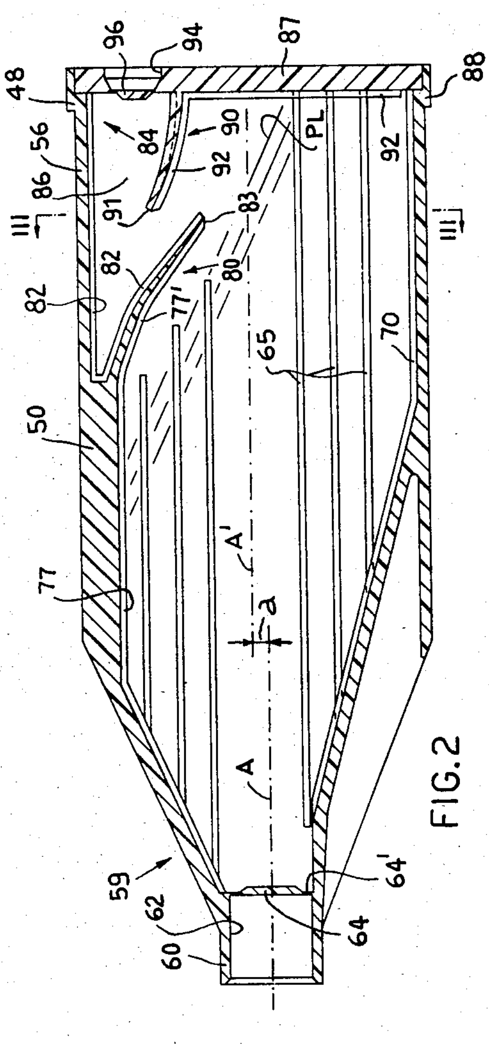
FIG. 2 is a view in longitudinal section of an ink cartridge for the head shown in FIG. 1.
Figure 4:
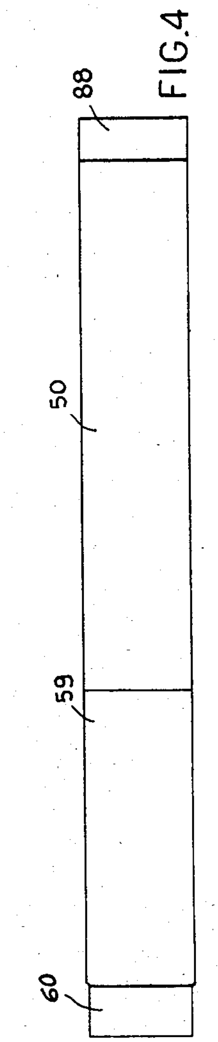
FIG. 4 is a plan view of the cartridge shown in FIG. 2.
Figure 3:
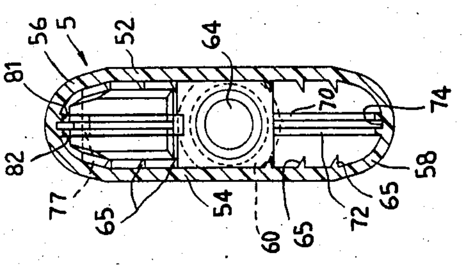
FIG. 3 is a view in cross-section taken along line III—III in FIG. 2.

Referring to FIGS. 2, 3 and 4, the cartridge 50 is of substantially cylindrical flattened shape wherein two flat side wall portions 52 and 54 which are parallel to each other are connected at their top and at their bottom by two curved wall portions 56 and 58 respectively. At the front (at the left in FIG. 2), the cartridge 50 necks down as shown at 59, terminating with a cylindrical engagement or connecting member 60 defining an outlet aperture or duct 62 for the ink. The duct 62 is initially closed by a flexible diaphragm 64. Fixed to the inside wall surface of the end portion 16 of the holder 14 (see FIG. 1) is a tube 66 which is parallel to the longitudinal axis A' of the holder 14 and which is aligned with the hole 20. The outside diameter of the tube 66 is such as to permit it to be inserted within the connecting member 60 of the cartridge 50 when the cartridge is fitted into the holder 14. The member 60 telescopes over the tube 66.

The tube portion 66 is cut off with an inclined surface 67 so as to impart to the free end thereof a beak-like configuration as indicated at B, to facilitate rupturing the diaphragm 64 (see FIG. 1) at the moment at which the cartridge is introduced into the holder 14, along at least a part of the circular edge 64' of the diaphragm 64, which is of reduced thickness. In order to ensure that the cartridge 50 is not fitted into the holder 14 in an upside-down position, the axis A of the connecting member 60 is offset from the centre axis A' of the holder 14 by a small distance a between the axes.

The side wall portions 52 and 54 of the cartridge 50 (see FIG. 3) are internally provided with straight ribs 65 which are parallel to the longitudinal axis of the cartridge 50. The ribs 65 perform a stabilising function in regard to the ink, in that they limit agitation of the ink caused by rapid variations in the speed of the carriage 10 and during reversals of the carriage movement.

Disposed on the inside surface of the curved bottom wall portion 58 is a pair of flat, parallel ribs 70 and 72 which are spaced to define a narrow central channel 74 which is open upwardly, the width thereof being about 0.4 mm.

Disposed on the inside surface of the upper curved wall portion 56 is a single rib 77 of rectangular section, which extends parallel to the longitudinal axis of the cartridge 50 substantially over the entire length thereof. The inside surface 68 of the tube portion 66 (see FIGS. 1 and 5) is likewise provided with three narrow channels or grooves 69 which are disposed parallel to the axis ofthe tube portion 66, in order by a capillary effect to promote the discharge flow of the ink and to prevent the formation of liquid layers which would close off the hole 20, blocking the flow of ink. The channel 74 and the rib 77 promote the discharge flow of the ink towards the aperture 20, preventing the formation of meniscuses caused by the surface tension of the ink. A deflector 80 extends inwardly of the cartridge 50 from the upper curved wall portion 56, the deflector 80 being inclined downwardly and directed towards the rearward part of the cartridge 50. The width of the deflector 80 is less than the spacing between the side wall portions 52 and 54 and an extension portion 77' of the rib 77 extends along the underside of the deflector 80 while provided on the top side, in the longitudinal direction thereof, is a pair of ribs 81 and 82 which are similar to the ribs 70 and 72 and which extend back over the rearward portion 84 of the curved wall portion 56.

At its rearward end (to the right in FIG. 2), the cartridge 50 is closed by a flat cover 87 which is bonded to the rearward edge 88 after the cartridge has been filled with ink. Fixed to the face of the cover 87 which is directed inwardly of the cartridge is a second deflector 90 which is directed in the opposite direction to the deflector 80 and which has a slight degree of concavity, directed towards the curved wall portion 56 of the cartridge 50. A pair of ribs 92 of the same type as the ribs 70 and 72 extend over the deflector 90 and are extended towards the bottom of the cover 87.

The cartridge 50 is only partially filled with ink and, since it has a stable working position in which its longitudinal axis A' is inclined at about 25°, the free surface of the ink assumes the position shown by the line PL in FIGS. 1 and 2. The inclination of the deflector 80 is such that its free end 83 is at a spacing of at least 1 mm and preferably 2 mm from the free surface PL of the ink. Similarly, the free end 91 of the deflector 90 overlaps the deflector 80 by a distance of about 2 mm so as to create a Z-shaped path for any bubbles of gas which are produced in the operation of emission of the droplets of ink and which are collected in the space 86 above the two deflectors. Above the deflector 90, the cover 87 is provided with an opening 94 which is initially closed by a diaphragm 96 which can be ruptured for the purposes of inserting a suction conduit, as will be seen hereinafter.

The holder 14 is mounted on the carriage 10 with the longitudinal axis A' thereof inclined at about 25° with respect to the horizontal to promote the flow of ink towards the nozzles 38.

As has already been indicated above, during the printing movement, bubbles of gas may be formed, which accumulate in the space 86 in the cartridge 50. If such bubbles were not removed, they would increase the pressure within the cartridge, seriously impairing the proper functioning of the printer. The gas contained in the cartridge 50 is removed by means of a removable suction conduit 100 (see FIG. 1) which can be manually inserted into the opening 94 in the cover 87, whenever a fresh cartridge is fitted into the holder 14. The conduit 100 is carried by an arm 102 which is pivoted on a pin 104 which is also hollow and which is elastically fixed between two forks 106 of the carriage 10 and which is provided with radial holes 108 communicating with the arm 102. The arm 102 is of an arcuate shape to permit its end 103 to be inserted into the opening 94 when the arm 102 is rotated manually in the anticlockwise direction. The pin 104 is then connected to a suction device of the type described in the above-indicated patent application, for which reason it is not shown in the drawings. The end 103 is provided with a cylindrical beak portion 109 of pointed shape, for rupturing the diaphragm 96, having an upper aperture 110 for communicating the space 86 in the cartridge 50 with the arm 102. The arm 102 is held with its end 103 air-tightly engaged into the opening 94 by means of a spring 112 whereby it represents a cartridge locking member, which faces towards the connecting portion 60 of the holder 14. The two deflectors 80 and 90 prevent any ink sprays which are caused by the rapid variations in the speed of the carriage 10 from escaping by way of the conduit 100.

Figure 10:
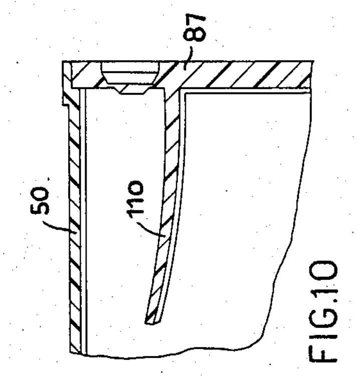
FIG. 10 is an alternative form of the cartridge shown in FIG. 2.

FIG. 10 shows an alternative form of the deflector 90 shown in FIGS. 1 and 2, wherein a single deflector 110 which is fixed to the cover 87 replaces the deflectors 80 and 90 shown in FIGS. 1 and 2. The deflector 110 extends inwardly of the cartridge 50 in a direction substantially parallel to the longitudinal axis of the cartridge, facing the tube portion 66 of the holder 14, and is of a length which is about double the length of the deflector 90 shown in FIGS. 1 and 2.

Figure 6:
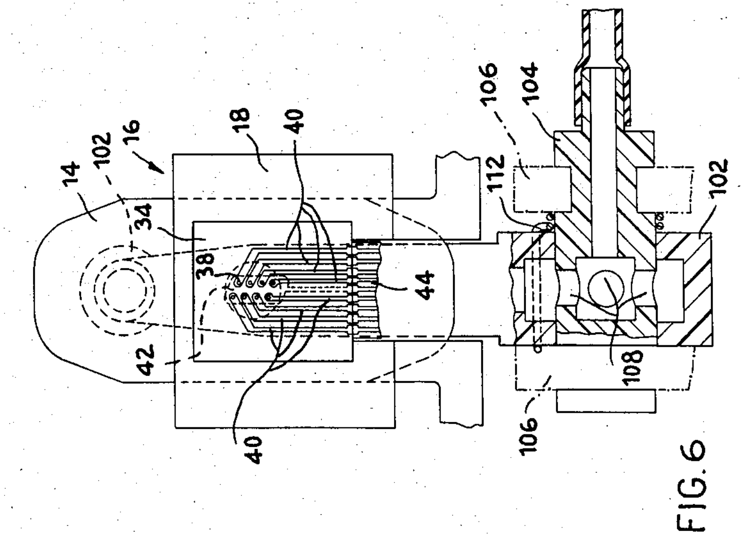
FIG. 6 is a front view of the head shown in FIG. 1, containing a single ink cartridge.

FIG. 6 shows a front view of the holder 14 for a multi-nozzle, single-colour printing head. The plate 34 is provided for example with eight nozzles which are disposed in two columns each of four nozzles which are staggered by half a nozzle pitch, as described in the patent application to which reference was made above.

Figure 7:
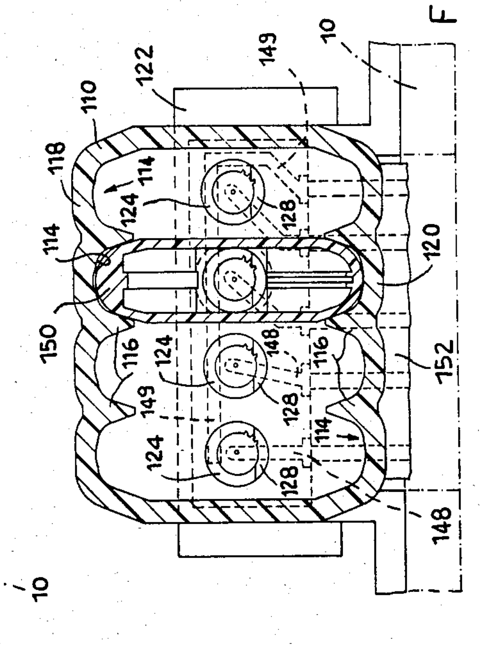
FIG. 7 is a view in cross-section taken along line VII—VII in FIG. 1.

In accordance with another version, for a multi-colour printing head, the printer is provided with a plurality of cartridges which are similar to the cartridge 50 shown in FIG. 2. FIG. 7 shows a holder 110 having side-by-side seats 114, mounted on the carriage 10, and arranged to hold for example four cartridges 150. Each cartridge 150 can be manually fitted into the holder 110 and is filled with ink of a different colour.

Figure 8:
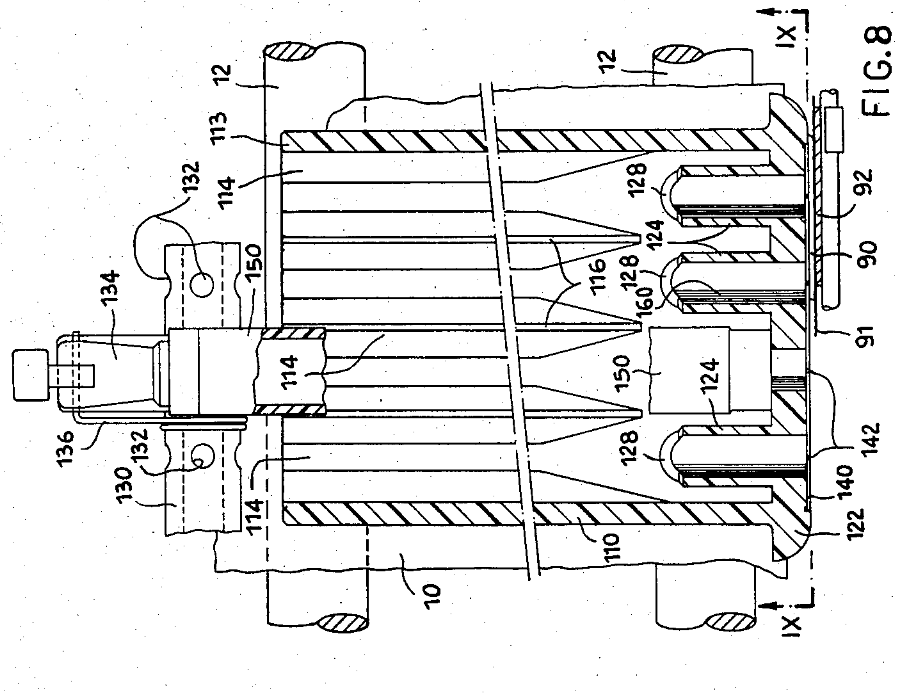
FIG. 8 is a view in horizontal section taken along line VIII—VIII in FIG. 7.

The holder 110 is open in its rearward part 113 (see FIG. 8) to permit insertion of the cartridges 150; for the sake of simplicity, FIGS. 7 and 8 show only a single cartridge which is fitted in the appropriate seat 114. Each seat 114 is defined by pairs of parallel guides 116 which project from the upper wall portion 118 and the lower wall portion 120 of the holder 110.

The holder 110 is closed at its front end by a wall portion 122 through which pass four tubes or ducts 124 which terminate at the inward end in a beak configuration 128 which is generally similar to the beak B on the tube portion 66 in FIG. 1.

The carriage 10 carries a hollow tube 130 which is similar to the pin 104 in FIG. 1 and which is connected to a suction pump. The tube 130 has four sets of radial holes 132, while mounted in association therewith are four hollow arms 134 similar to the arm 102 in FIG. 1. Each arm 134 is rotatable on the tube 130 and can be manually inserted into and removed from the corresponding cartridge.

Each arm 134 is urged by its own spring 136 towards the holder 110 and terminates with a beak or end portion which is similar to that on the arm 102 in FIG. 1 and which is provided for rupturing the rearward diaphragm 96 of the corresponding cartridge 150 and to connect the associated space 86 above the ink to the suction pump.

Figure 9:
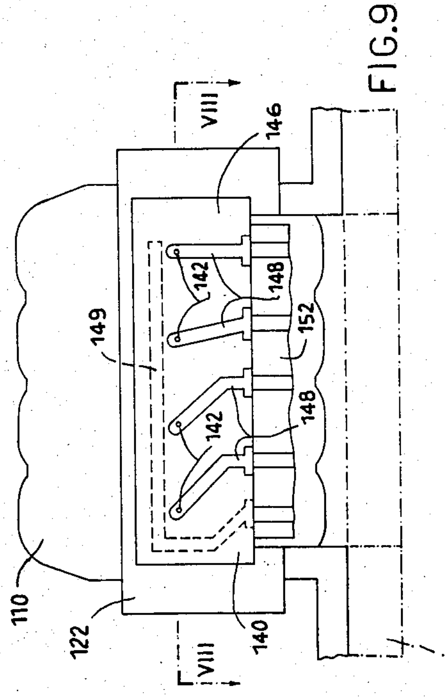
FIG. 9 is a view in section taken along line IX—IX in FIG. 1.

Bonded to the outside face of the wall portion 122 (see FIGS. 8 and 9) is a ceramic plate 140 through which pass printing nozzles 142, the plate 140 being similar to the plate member 34 in FIG. 1. By way of example, FIGS. 7, 8 and 9 show only four nozzles 142, each of which is coaxial with the corresponding duct 124.

Deposited on an outside face 146 of the plate 140 are four conductor tracks 148, one for each nozzle 142. Deposited on the opposite face of the plate 140, being the face which is directed inwardly of the ducts 124, is a common track 149 which is in contact with the conductive inks in the four cartridges. A flexible flat conductor member 152 having five conductors is joined as by welding to the plate 140 for connecting each of the tracks 148 and 149 to a control circuit (not shown in the drawings). Whenever the ink of a given colour is exhausted, the corresponding cartridge 150 can be easily replaced by a fresh cartridge without giving rise to long interruptions in the printing operations.

Figure 5:
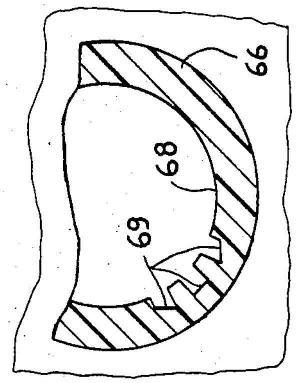
FIG. 5 is a view in section on an enlarged scale of the engagement member of the head shown in FIG. 1.

Disposed along the inside wall of the ducts 124 (see FIG. 8) are channels 160 which are similar to the channels 69 in FIG. 5, for the purposes of breaking up any films of liquid which would block off the regular flow of ink towards the nozzles 142.

We claim:

1. An ink jet printing head for a printer for printing in a variety of colours, wherein the ink is selectively projected on to a printing carrier through a plurality of nozzles by means of electrical pulses, comprising a plurality of reservoirs, each containing an electrically conductive ink of a different colour, each nozzle being associated with a pair of electrodes, at least one of which is in contact with the ink, the emission of the ink from a nozzle being caused by selectively generating voltage pulses between the electrodes associated with the nozzle and comprising suction means for exhausting bubbles produced by the emission of ink from each nozzle, wherein each of the reservoirs comprises an ink cartridge which can be manually fitted separately to a corresponding engagement element carried by a common holder, the element being capable of being engaged into an aperture in the corresponding cartridge and the suction means can be selectively connected to each cartridge when it is fitted into the holder and that each cartridge comprises an opening which is closed by a diaphragm which can be pierced by a communicating element when it is connected to the associated cartridge.

2. A head according to claim 1, characterised in that the holder comprises a plurality of seats separated by parallel guides for receiving the cartridges in side-by-side relationship.

3. A head according to claim 2, characterised in that each of the cartridges comprises an engagement member which is fixed with respect to the housings when the cartridge is fitted into the holder.

4. A head according to claim 3, characterised in that the holder is open at one end to permit the cartridges to be inserted and is closed at an opposite end by a wall portion facing the printing carrier and through which pass the engagement members.

5. A head according to claim 4, characterised in that a single thin plate of ceramic material through which the nozzles pass supports said electrodes, at least one of which surrounds said nozzle, said plate being externally fixed to the wall portion in such a way that the nozzles are aligned and communicate with the engagement members.

6. An ink jet printing head, wherein a conductive ink is in contact with a pair of electrodes and is ejected through a nozzle by voltage pulses applied to said electrodes, comprising a holder for removably housing at least one ink cartridge filled with said ink and having an ink conduit normally closed by a diaphragm, said holder being closed at one end by a front wall portion and open at the opposite end to permit the cartridge to be inserted in or removed from the holder, said front wall portion carrying a nozzle plate carrying at least one nozzle passing therethrough, said pair of electrodes being disposed on opposite surfaces of said plate and said one electrode surrounding the inner edge of said nozzle, said front wall portion further carrying a hollow engaging member aligned and communicating with said nozzle and adapted to penetrate into said conduit by perforating said diaphragm when said cartridge is inserted in the holder, whereby the ink is brought in contact with said at least one electrode.

7. A head according to claim 6, wherein said nozzle plate carries a plurality of nozzles arranged according to a printing matrix, said ink being in contact with a plurality of electrodes disposed on one surface of said plate, each electrode being associated with a corresponding nozzle of said matrix, said plate further carrying a common electrode disposed on the opposite surface of said plate, whereby upon selectively applying a plurality of voltage pulses between each one of said plurality of electrodes and the common electrode, ink drops are ejected through said nozzles.

8. An ink jet printing head for printing in a variety of colours, wherein the ink is selectively projected onto a printing carrier through a plurality of nozzles, comprising a holder for removably housing a plurality of separate cartridges, each containing an ink conduit normally closed by a diaphragm, said holder being closed at one end by a front wall portion carrying a nozzle plate facing said printing carrier and being open at the opposite end to permit the cartridges to be separately inserted in and removed from the holder, said front wall carrying hollow engaging elements each one aligned and communicating with a corresponding nozzle, whereby upon the insertion of a single cartridge in said holder, said engaging element penetrates into said conduit by perforating said diaphragm to permit said ink to reach said nozzle.

9. A head according to claim 8, wherein said nozzle plate carries said plurality of nozzles, each of which being arranged in alignment with a corresponding engaging element, said ink being in contact with a plurality of electrodes disposed on one surface of said plate, each electrode being associated with a corresponding nozzle, said plate further carrying a common electrode disposed on an opposite surface of the plate, whereby upon selectively applying a plurality of voltage pulses between each one of said plurality of electrodes and the common electrode, ink drops are selectively ejected through said nozzles towards said printing carrier.

10. A head according to claim 6 or 8, comprising a locking member associated with a cartridge and pivotally mounted on said holder, said locking member being manually displaceable from a first position in which it resiliently urges said cartridge into said holder to a second position in which said member is spaced from said cartridge to permit an exhausted cartridge to be removed from the holder, said locking member engaging in said first position to seat portion of said cartridge substantially opposite to said ink conduit and to said nozzles.

11. A head according to claim 10, wherein said head is mounted on a reciprocating carriage, including the improvement comprising a suction device for extracting ink gas accumulated into said cartridge during the printing process, wherein said suction device comprises a communication element carried by said locking member, said seat portion of the cartridge having a diaphragm adapted to be perforated by said communication element to communicate the cartridge with the suction device, when said locking member is in said first position.

12. A head according to claim 11, wherein said seat portion is disposed above the free surface of the ink in the reservoir.

13. A head according to claim 11, wherein said locking member comprises a hollow arm having a first end pivoted on a hollow shaft fixed to said holder and connected to a suction source and a second end in said diaphragm of the form of a beak capable of piercing the cartridge.

14. An ink cartridge for use with a printing head, said cartridge being adapted to be removably fitted to said head and having an elongated shape, said cartridge comprising an engagement member carried on a first end of said cartridge to be engaged with a corresponding conduit of said head for supplying the ink to said head, a first diaphragm closing said engaging member, an opening provided on a closure wall disposed at another end of said cartridge opposite to said first end to be engaged by a locking member of said head, and a second diaphragm closing said opening, said diaphragms being rupturable by said conduit and said locking member respectively when said cartridge is fitted into said head.

15. A cartridge according to claim 14, comprising two flat wall portions joined by two curved wall portions, the spacing between the flat wall portions being less than the spacing between the curved wall portions, one of said curved wall portions, which is normally submerged in the ink, having an open capillary channel departing from said engagement member and extending along said one curved wall, for promoting the discharge flow of the ink, and said other curved wall portion being provided with a rib extending therealong for preventing the formation of liquid films into said cartridge.

16. A cartridge according to claim 14, wherein said closure wall carries a deflector placed below said opening and extending inwardly of the cartridge so as to prevent splashes of ink from reaching the opening.

17. A cartridge according to claim 16, wherein said deflector is of a length such that the free end thereof is spaced from the free surface of the ink by at least 1 mm, when the cartridge is mounted on a support in a position with a predetermined inclination.

18. A cartridge according to claim 16, wherein said deflector extends substantially in a direction opposite to the nozzle, with a curvature such that its convexity faces towards said opening and wherein a second deflector connected to said other curved wall is disposed beneath the opening and is of such a length as partially to face the first deflector in order to define a tortuous path for the bubbles to be sucked away.

* * * * *